United States Patent
Schipper et al.

(10) Patent No.: US 9,329,274 B2
(45) Date of Patent: May 3, 2016

(54) CODE MINUS CARRIER MULTIPATH OBSERVATION FOR SATELLITE EXCLUSION

(71) Applicant: Honeywell International Inc., Morristown, NJ (US)

(72) Inventors: Brian W. Schipper, Brooklyn Park, MN (US); Mahesh K. Jeerage, New Brighton, MN (US)

(73) Assignee: Honeywell International Inc., Morris Plains, NJ (US)

( * ) Notice: Subject to any disclaimer, the term of this patent is extended or adjusted under 35 U.S.C. 154(b) by 493 days.

(21) Appl. No.: 13/937,818

(22) Filed: Jul. 9, 2013

(65) Prior Publication Data

US 2015/0015437 A1 Jan. 15, 2015

(51) Int. Cl.
*G01S 19/22* (2010.01)
*G01S 19/42* (2010.01)

(52) U.S. Cl.
CPC ............... *G01S 19/22* (2013.01); *G01S 19/428* (2013.01)

(58) Field of Classification Search
CPC ....... G01S 19/22; G01S 19/29; G01S 19/428; G01S 19/44
USPC ....................................... 342/357.61, 357.27
See application file for complete search history.

(56) References Cited

U.S. PATENT DOCUMENTS

| | | | |
|---|---|---|---|
| 4,384,293 A | 5/1983 | Deem et al. | |
| 4,719,469 A | 1/1988 | Beier et al. | |
| 4,894,662 A | 1/1990 | Counselman | |
| 4,963,889 A | 10/1990 | Hatch | |
| 5,021,792 A | 6/1991 | Hwang | |
| 5,072,227 A | 12/1991 | Hatch | |
| 5,119,101 A | 6/1992 | Barnard | |
| 5,185,610 A | 2/1993 | Ward et al. | |
| 5,450,448 A | 9/1995 | Sheynblat | |
| 5,471,217 A | 11/1995 | Hatch et al. | |
| 5,526,291 A | 6/1996 | Lennen | |

(Continued)

FOREIGN PATENT DOCUMENTS

| | | |
|---|---|---|
| WO | 9829755 | 7/1998 |
| WO | 2008025151 | 3/2008 |

OTHER PUBLICATIONS

European Patent Office, "Extended European Search Report from EP Application No. 14173564.7 mailed Dec. 4, 2014", "from Foreign Counterpart of U.S. Appl. No. 13/937,818", Dec. 4, 2014, pp. 1-7, Published in: EP.

(Continued)

*Primary Examiner* — Harry Liu
(74) *Attorney, Agent, or Firm* — Fogg & Powers LLC

(57) ABSTRACT

A method comprises generating a respective code-carrier difference for each of a plurality of satellite vehicle and signal frequency combinations, wherein the code-carrier difference is based on a code range and a carrier range. The method also comprises filtering the respective code-carrier difference for an unknown bias and random noise; determining whether multipath is present for each of the plurality of satellite vehicle and signal frequency combinations based on the respective filtered code-carrier difference; and computing a position solution based on trust placed in respective measurements from each of the plurality of satellite vehicle and signal frequency combinations, the trust based on whether multipath is present for the respective satellite vehicle and signal frequency combination.

20 Claims, 3 Drawing Sheets

(56) References Cited

U.S. PATENT DOCUMENTS

| | | | |
|---|---|---|---|
| 5,534,875 A | 7/1996 | Diefes et al. | |
| 5,543,804 A | 8/1996 | Buchler et al. | |
| 5,548,293 A | 8/1996 | Cohen | |
| 5,563,917 A | 10/1996 | Sheynblat | |
| 5,583,513 A | 12/1996 | Cohen | |
| 5,907,578 A | 5/1999 | Pon et al. | |
| 5,917,445 A | 6/1999 | Schipper et al. | |
| 2005/0212696 A1* | 9/2005 | Bartone | G01S 19/43 342/357.27 |
| 2007/0042790 A1* | 2/2007 | Mohi | G01C 21/20 455/456.5 |
| 2009/0213912 A1 | 8/2009 | Brenner | |
| 2012/0026038 A1 | 2/2012 | Vollath | |
| 2012/0293365 A1 | 11/2012 | Ashjaee et al. | |
| 2012/0319898 A1 | 12/2012 | Tominaga et al. | |
| 2013/0335268 A1* | 12/2013 | Enge | G01S 19/22 342/357.61 |

OTHER PUBLICATIONS

Braasch, "Isolation of GPS Multipath and Receiver Tracking Errors", "Procededings of the 1994 National Technical Meeting of the Institute of Navigation, The Institute of Navigation", Jan. 26, 1994, pp. 511-521.

* cited by examiner

CODE MINUS CARRIER MULTIPATH OBSERVATION FOR SATELLITE EXCLUSION

BACKGROUND

The worldwide global navigation satellite system (GNSS), consisting of global positioning system (GPS), Galileo, Glonass, Compass, and others are growing, providing increasing navigation capabilities. In general, accuracy is improved, and the number of available satellites is consistently higher than when a GPS-only system was available. However, a source of measurement error and solution inaccuracy still exists in the form of multipath error.

SUMMARY

In one embodiment, a method is provided. The method comprises generating a respective code-carrier difference for each of a plurality of satellite vehicle and signal frequency combinations, wherein the code-carrier difference is based on a code range and a carrier range. The method also comprises filtering the respective code-carrier difference for an unknown bias and random noise; determining whether multipath is present for each of the plurality of satellite vehicle and signal frequency combinations based on the respective filtered code-carrier difference; and computing a position solution based on trust placed in respective measurements from each of the plurality of satellite vehicle and signal frequency combinations, the trust based on whether multipath is present for the respective satellite vehicle and signal frequency combination.

DRAWINGS

Figure 1:
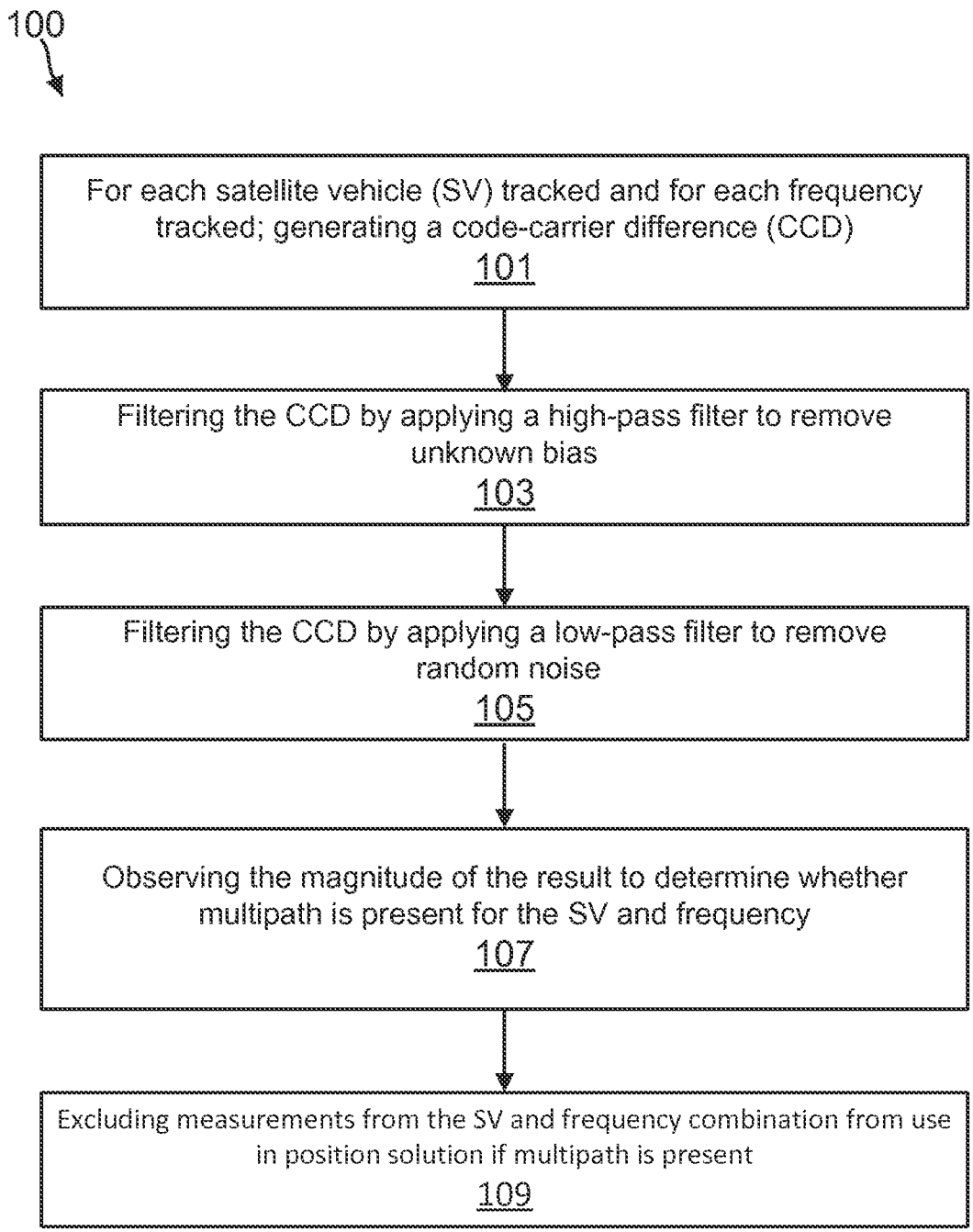
Figure 2:
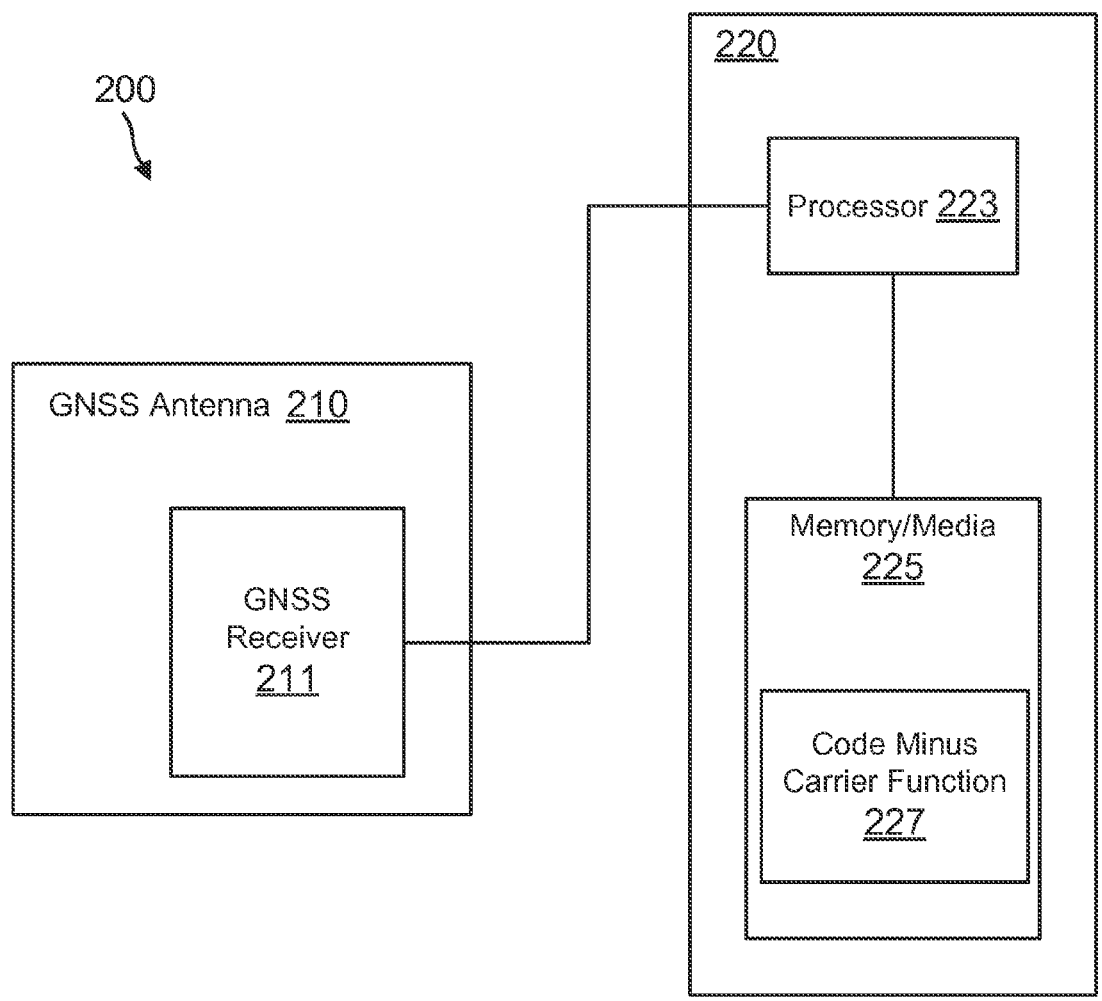
Figure 3:
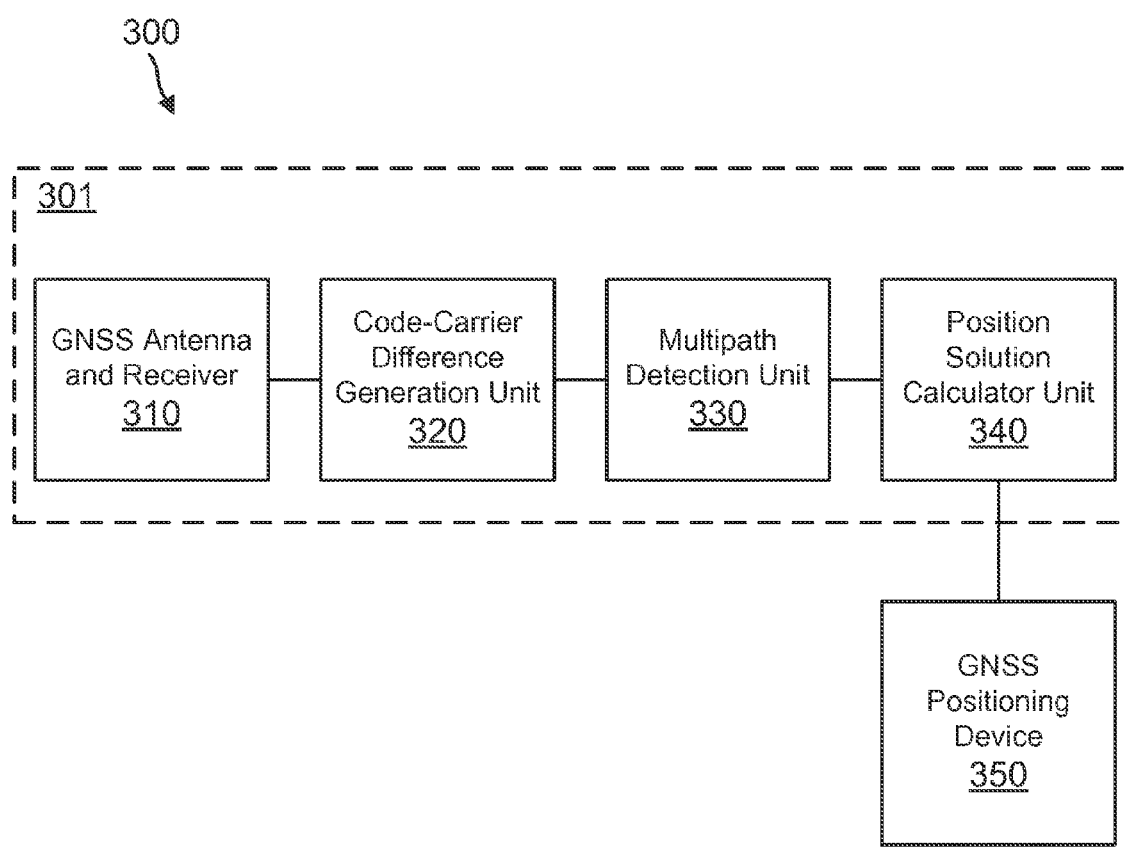

Understanding that the drawings depict only exemplary embodiments and are not therefore to be considered limiting in scope, the exemplary embodiments will be described with additional specificity and detail through the use of the accompanying drawings, in which:

FIG. 1 a block diagram of one embodiment of an exemplary method of code minus carrier multipath observation and satellite exclusion;

FIG. 2 illustrates a block diagram of an example code minus carrier multipath observation and satellite exclusion system; and FIG. 3 a block diagram for a multipath observation and satellite exclusion apparatus.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described herein utilize the increased constellation size of the worldwide GNSS systems to detect the presence of multipath errors and ignore measurements from error-giving satellites. Rather than estimating the multipath errors, the techniques described herein need only detect the presence of multipath errors. As used herein, the terms "multipath error" and "multipath" can be used interchangeably. Then, with the knowledge of the presence of multipath errors, the measurements for that satellite are excluded from position computations.

FIG. 1 is a block diagram of one embodiment of an exemplary method 100 of code minus carrier multipath observation and satellite exclusion. Method 100 is performed for each satellite vehicle (SV) tracked and for each frequency tracked. In particular, at block 101 a code-carrier difference is generated for each SV tracked and for each frequency tracked. The combination of a given SV and a given frequency is referred to herein as a SV and frequency combination. The code-carrier difference is calculated by taking the difference between code range and carrier range. The fundamental measurements from a GNSS receiver are range measurements and a measurement of distance from the GNSS antenna to satellite vehicle, which can be derived from both the digital code portion of the GNSS signal and also from its carrier signal. The range derived from the code is referred to as code range. Code range is a pseudorandom digital code signal recovered by the GNSS receiver which can be used to provide code measurements including a measure of the distance to the SV. This is not necessarily the same as actual range to the SV because of a lack of time clock synchronization between the satellite and the GNSS receiver. However, this problem regarding lack of time clock synchronization can be substantially overcome by the use of code range measurements from multiple SVs. The code range does not contain systemic bias, but exhibits noise that affects measurements in the range of decimeters (dm). Also present on the code range are multipath errors, which can be many meters in magnitude.

The range derived from the carrier is called carrier range. Carrier range is a measure of accumulated carrier phase made by the GNSS receiver. The carrier range has an "unknown" and potentially large bias, but has noise only in the range of millimeters (mm). The large unknown bias results from the fact that the carrier range is typically the output of an integrator whose initial value is typically random or 0. Another error present on both code and carrier ranges is caused by the GNSS signal passing through the ionosphere. Generally, when a GNSS signal passes through the ionosphere, it causes a delay in the code range signal, but causes an advance in the carrier range signal.

Multipath errors on the code range can be many meters in magnitude. Multipath errors on carrier range are limited to a few centimeters (cm). Another important quality of multipath is that it is dynamic. Under static conditions, it resembles a lightly damped random process with a time constant of typically 100 seconds. When moving, multipath errors begin varying more quickly. Regardless of the temporal or spectral characteristics, because the errors are small on carrier range compared to code range the presence of multipath errors can be observed by observing the difference between code and carrier range over time. This is called the code-carrier difference.

At block 103, the code-carrier difference (CCD) is filtered by a high-pass filter to mitigate the lower frequency unknown bias. At block 105, the CCD is filtered by a low-pass filter to mitigate random noise. At block 107, the magnitude of the CCD is observed to determine whether multipath is present for the given SV and frequency combination. At block 109, the trust placed in the measurements from the given SV and frequency combination is determined based on whether multipath is present for the given SV and frequency combination. In some embodiments, if multipath is present, the measurements from the given SV and frequency combination are not trusted and excluded from use in a position solution, where a position solution is a calculation of the positioning of a GNSS receiver. For example, in some embodiments, if the magnitude of the CCD exceeds a predetermined threshold, the measurements from the respective SV and frequency combination are excluded. Likewise, in such embodiments, if the magnitude of the CCD is less than a predetermined threshold, the measurements from the respective SV and frequency combination are trusted and used in computing a position solution.

In one embodiment, trusted satellites are used to compute a position solution. If more than 4 SV and frequency combinations are trusted, then the position solution is a least squares error solution. In an alternative embodiment, a weighted least squares solution is used, where each measurement is weighted or de-weighted according to the level of trust placed on the signal. For example, if the corresponding CCD exceeds the threshold, the measurements from the respective SV and frequency combination are weighted less. Similarly, if the corresponding CCD does not exceed the threshold, the measurements from the respective SV and frequency combination are weighted more. Thus, in some embodiments, the measurements from a given SV/frequency combination are excluded if the corresponding CCD exceeds the threshold. In other embodiments, the measurements from a given SV/frequency combination are given less weight if the corresponding CCD exceeds the threshold. FIG. 2 illustrates a hardware block diagram of an example code minus carrier multipath observation and satellite exclusion system. The system 200 includes a GNSS antenna 210, GNSS receiver 211, multipath observation and satellite exclusion device 220, processor 223, and memory/media 225. GNSS antenna 210 comprises a GNSS receiver 211. GNSS receiver 211 has the ability to lock on to the carrier signal from a satellite and make carrier range measurements in addition to measuring code range. Carrier range measurements include making a phase lock loop measurement.

GNSS receiver 211 is coupled to processor 223. Processor 223 is coupled to memory/media 225 that include instructions for the code minus carrier function 227. Code minus carrier function 227 includes instructions which cause the processor to form a code-carrier difference (CCD) for each of a plurality of tracked satellite vehicle (SV) and frequency combinations, filter the respective CCD of each SV/frequency combination through a band pass filter to remove unknown bias and random noise. In one embodiment, a high-pass filter is used to remove the unknown bias, and a low-pass filter is used to remove the random noise. Then, the processor determines whether multipath error is present based on the magnitude of the results. In one embodiment, if multipath are present, measurements for the SV and frequency combination are excluded. If multipath is not present, then the measurements are used. In another embodiment, if multipath is present, measurements from the SV and frequency combination are weighted or de-weighted depending on the level of trust placed in the measurement, as discussed above. If multipath is not detected, the measurement is weighted more to reflect that the measurement is trusted.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

FIG. 3 is a hardware block diagram for a multipath observation and satellite exclusion apparatus 300. Multipath observation and satellite exclusion apparatus includes a GNSS antenna and receiver 310. GNSS antenna and receiver are configured to be able to measure carrier range and code range from a GNSS signal. The GNSS Antenna and Receiver 310 can lock on to a carrier signal from a satellite and make carrier range measurements. Carrier range measurements include making a phase lock loop measurement. The GNSS Antenna and Receiver 310 are coupled to a Code-Carrier Difference Generation unit 320.

The Code-Carrier Difference Generation Unit 320 is configured to calculate a code-carrier difference (CCD) by taking the difference between the code range and carrier range. The CCD is calculated for a given SV and signal frequency combination. The code-carrier difference generation unit 320 is coupled to a multipath detection unit 330.

Multipath detection unit 330 is configured to filter the code-carrier difference for the given SV/frequency combination and detect the presence of multipath error. Multipath detection unit 330 filters the CCD with a high pass filter configured to filter out unknown bias. Then a low pass filter is applied to filter out random noise. Once filtered, the magnitude of the CCD is compared to a multipath threshold to determine whether or not multipath is present. If the threshold is exceeded and multipath is detected, the multipath detection unit 330 determines that the measurements for the given SV/frequency combination are not trusted. In some embodiments, when the measurements are not trusted, the multipath detection unit 330 removes the measurements for the given SV and frequency combination from a computation of a position solution. In particular, the multipath detection unit 330 is coupled to a position solution calculator unit 340. Thus, removed or excluded measurements are either not passed to the position solution calculator 340 by the multipath detection unit 330 or are otherwise identified as untrusted.

The position solution calculator unit 340 is configured to calculate a solution position based on SV measurements. In one embodiment, when 4 or more trusted SVs are available and are not removed by the multipath detection unit 330, a least squared error solution is calculated. In another embodiment, the multipath detection unit 330 does not remove measurements from SV and frequency combinations exhibiting multipath, and instead the position solution calculator unit 340 weights the measurements from given SV and frequency combinations based on the multipath threshold to solve a weighted least squares solution. It is to be understood that the above embodiments are not to be limiting, and other methods of weighting, removal, combination thereof, or other method of solution calculation may be used as known to those having ordinary skill in the art. The position solution calculator unit 340 is coupled to GNSS Positioning Device 350.

GNSS Positioning Device 350 is configured to use the position solution calculated by position solution calculator unit 340 to display positioning information of the GNSS positioning device or vehicle within which the GNSS positioning device 350 is located. In one embodiment, the multipath observation and satellite exclusion apparatus 300 is implemented into the positioning system of an aircraft.

EXAMPLE EMBODIMENTS

Example 1 includes a method comprising: generating a respective code-carrier difference for each of a plurality of satellite vehicle and signal frequency combinations, wherein the code-carrier difference is based on a code range and a carrier range; filtering the respective code-carrier difference for an unknown bias and random noise; determining whether multipath is present for each of the plurality of satellite vehicle and signal frequency combinations based on the respective filtered code-carrier difference; and computing a position solution based on trust placed in respective measurements from each of the plurality of satellite vehicle and signal frequency combinations, the trust based on whether multipath is present for the respective satellite vehicle and signal frequency combination.

Example 2 includes the method of Example 1 wherein computing the position solution based on trust placed in respective measurements from each of the plurality of satellite vehicle and signal frequency combinations comprises: excluding measurements from the respective satellite vehicle and signal frequency combination from the position solution computation if multipath is detected.

Example 3 includes the method of any of Examples 1-2 wherein computing the position solution based on trust placed in respective measurements from each of the plurality of satellite vehicle and signal frequency combinations comprises: including measurements from the respective satellite vehicle and signal frequency combination in the position solution computation if multipath is not detected.

Example 4 includes the method of Examples 1-3, wherein determining whether multipath is present for each of the plurality of satellite vehicle and signal frequency combinations comprises comparing a magnitude of the respective filtered code-carrier difference to a multipath threshold, wherein the multipath threshold is a threshold value that, when exceeded, indicates the presence of multipath error.

Example 5 includes the method of any of Examples 1 or 4 wherein computing a position solution based on trust placed in respective measurements from each of the plurality of satellite vehicle and signal frequency combinations comprises: weighting the respective measurements from each of the plurality of satellite vehicle and signal frequency combinations based on whether multipath is present for the respective satellite vehicle and signal frequency combination; and calculating a weighted least squares solution based on the respective weighted measurements.

Example 6 includes the method of Example 1, wherein unknown bias is filtered out with a high pass filter, wherein the high pass filter is configured to only allow frequencies above a frequency of the unknown bias to pass.

Example 7 includes the method of any of Examples 1-6, wherein random noise is filtered out with a low pass filter, wherein the low pass filter is configured to only allow frequencies below a frequency of the random noise to pass.

Example 8 includes the method of any of Examples 1-5, wherein unknown bias and random noise are removed using a band pass filter, wherein the band pass filter is configured to allow only frequencies above a frequency of the unknown bias, and below a frequency of the random noise.

Example 9 includes a program product comprising a processor-readable medium on which program instructions are embodied, wherein the program instructions are configured, when executed by at least one programmable processor, to cause the at least one programmable processor to: generate a respective code-carrier difference for each of a plurality of satellite vehicle and signal frequency combinations, wherein the code-carrier difference is based on a code range and a carrier range; filter the respective code-carrier difference for an unknown bias and random noise; determine whether multipath is present for each of the plurality of satellite vehicle and signal frequency combinations based on the respective filtered code-carrier difference; and compute a position solution based on trust placed in respective measurements from each of the plurality of satellite vehicle and signal frequency combinations, the trust based on whether multipath is present for the respective satellite vehicle and signal frequency combination.

Example 10 includes the program product of Example 9, wherein the program instructions are further configured to cause the at least one programmable processor to exclude measurements from the respective satellite vehicle and signal frequency combination if multipath is detected for the respective satellite vehicle and signal frequency combination.

Example 11 includes the program product of Example 10, wherein the program instructions are further configured to cause the at least one programmable processor to include measurements from the respective satellite vehicle and signal frequency combination in the position solution computation if multipath is not detected cy.

Example 12 includes the program product of any of Examples 9-11, wherein the program instructions are further configured to cause the at least one programmable processor to determine the presence of multipath by comparing a magnitude of the respective filtered code-carrier difference to a multipath threshold, wherein the multipath threshold is a threshold value that, when exceeded, indicates the presence of multipath error.

Example 13 includes the program product of any of Examples 9 and 12, wherein the program instructions are further configured to: weight the respective measurements from each of the plurality of satellite vehicle and signal frequency combinations based on whether multipath is present for the respective satellite vehicle and signal frequency combination; and calculate a weighted least squares solution based on the respective weighted measurements.

Example 14 includes the program product of any of Examples 9-13, wherein the program instructions are further configured to cause the at least one programmable processor to filter the unknown bias with a high pass filter, wherein the high pass filter is configured to only allow frequencies above a frequency of the unknown bias to pass.

Example 15 includes the program product of any of Examples 9-14, wherein the program instructions are further configured to cause the at least one programmable processor to filter random noise with a low pass filter, wherein the low pass filter is configured to only allow frequencies below a frequency of the random noise to pass.

Example 16 includes the program product of any of Examples 9-13, wherein the program instructions are further configured to cause the at least one programmable processor to filter unknown bias and random noise using a band pass filter, wherein the band pass filter is configured to allow only frequencies above a frequency of the unknown bias, and below a frequency of the random noise.

Example 17 includes a code minus carrier multipath observation and satellite exclusion apparatus comprising: a GNSS antenna coupled to a GNSS receiver, the antenna and receiver configured to receive a satellite carrier signal; a code-carrier difference generation unit coupled to the GNSS antenna and GNSS receiver, the code-carrier difference generation unit configured to generate a code-carrier difference for each of a plurality of satellite vehicle and signal frequency combinations, wherein the code-carrier difference is based on a code range and a carrier range; and a multipath detection unit coupled to the code-carrier difference generation unit, the multipath detection unit configured to filter the respective code-carrier difference to filter out an unknown bias and random noise; wherein the multipath detection unit is further configured to determine whether multipath is present for each of the plurality of satellite vehicle and signal frequency combinations based on the respective filtered code-carrier difference.

Example 18 includes the apparatus of Example 17 further comprising a position solution calculator unit coupled to the multipath detection unit, the position solution calculator unit configured to calculate a position solution based on trust placed in respective measurements from each of the plurality of satellite vehicle and signal frequency combinations, the trust based on whether multipath is present for the respective satellite vehicle and signal frequency combination.

Example 19 includes the apparatus of Example 18, wherein the position solution calculator unit is configured to exclude respective measurements from the position solution calculation if multipath is detected for the respective satellite vehicle and signal frequency combination.

Example 20 includes the apparatus of any of Examples 17 and 18, wherein the position solution calculator unit is configured to calculate a weighted least squares solution based on respective weighted measurements, wherein measurements from each of the plurality of satellite vehicle and frequency combinations are weighted based on a respective code-carrier difference for the respective satellite vehicle and frequency combination.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   generating a respective code-carrier difference for each of a plurality of satellite vehicle and signal frequency combinations, wherein the code-carrier difference is based on a code range and a carrier range;
   filtering the respective code-carrier difference for an unknown bias and random noise;
   determining whether multipath is present for each of the plurality of satellite vehicle and signal frequency combinations based on the respective filtered code-carrier difference; and
   computing a position solution based on trust placed in respective measurements from each of the plurality of satellite vehicle and signal frequency combinations, the trust based on whether multipath is present for the respective satellite vehicle and signal frequency combination.

2. The method of claim 1 wherein computing the position solution based on trust placed in respective measurements from each of the plurality of satellite vehicle and signal frequency combinations comprises:
   excluding measurements from the respective satellite vehicle and signal frequency combination from the position solution computation if multipath is detected.

3. The method of claim 2 wherein computing the position solution based on trust placed in respective measurements from each of the plurality of satellite vehicle and signal frequency combinations comprises:
   including measurements from the respective satellite vehicle and signal frequency combination in the position solution computation if multipath is not detected.

4. The method of claim 1, wherein determining whether multipath is present for each of the plurality of satellite vehicle and signal frequency combinations comprises comparing a magnitude of the respective filtered code-carrier difference to a multipath threshold, wherein the multipath threshold is a threshold value that, when exceeded, indicates the presence of multipath error.

5. The method of claim 1 wherein computing a position solution based on trust placed in respective measurements from each of the plurality of satellite vehicle and signal frequency combinations comprises:
   weighting the respective measurements from each of the plurality of satellite vehicle and signal frequency combinations based on whether multipath is present for the respective satellite vehicle and signal frequency combination; and
   calculating a weighted least squares solution based on the respective weighted measurements.

6. The method of claim 1, wherein unknown bias is filtered out with a high pass filter, wherein the high pass filter is configured to only allow frequencies above a frequency of the unknown bias to pass.

7. The method of claim 1, wherein random noise is filtered out with a low pass filter, wherein the low pass filter is configured to only allow frequencies below a frequency of the random noise to pass.

8. The method of claim 1, wherein unknown bias and random noise are removed using a band pass filter, wherein the band pass filter is configured to allow only frequencies above a frequency of the unknown bias, and below a frequency of the random noise.

9. A program product comprising a processor-readable medium on which program instructions are embodied, wherein the program instructions are configured, when executed by at least one programmable processor, to cause the at least one programmable processor to:
   generate a respective code-carrier difference for each of a plurality of satellite vehicle and signal frequency combinations, wherein the code-carrier difference is based on a code range and a carrier range;
   filter the respective code-carrier difference for an unknown bias and random noise;
   determine whether multipath is present for each of the plurality of satellite vehicle and signal frequency combinations based on the respective filtered code-carrier difference; and
   compute a position solution based on trust placed in respective measurements from each of the plurality of satellite vehicle and signal frequency combinations, the trust based on whether multipath is present for the respective satellite vehicle and signal frequency combination.

10. The program product of claim 9, wherein the program instructions are further configured to cause the at least one programmable processor to exclude measurements from the respective satellite vehicle and signal frequency combination if multipath is detected for the respective satellite vehicle and signal frequency combination.

11. The program product of claim 10, wherein the program instructions are further configured to cause the at least one programmable processor to include measurements from the respective satellite vehicle and signal frequency combination in the position solution computation if multipath is not detected cy.

12. The program product of claim 9, wherein the program instructions are further configured to cause the at least one programmable processor to determine the presence of multipath by comparing a magnitude of the respective filtered code-carrier difference to a multipath threshold, wherein the multipath threshold is a threshold value that, when exceeded, indicates the presence of multipath error.

13. The program product of claim 9, wherein the program instructions are further configured to:
   weight the respective measurements from each of the plurality of satellite vehicle and signal frequency combinations based on whether multipath is present for the respective satellite vehicle and signal frequency combination; and
   calculate a weighted least squares solution based on the respective weighted measurements.

14. The program product of claim 9, wherein the program instructions are further configured to cause the at least one programmable processor to filter the unknown bias with a high pass filter, wherein the high pass filter is configured to only allow frequencies above a frequency of the unknown bias to pass.

15. The program product of claim 9, wherein the program instructions are further configured to cause the at least one programmable processor to filter random noise with a low pass filter, wherein the low pass filter is configured to only allow frequencies below a frequency of the random noise to pass.

16. The program product of claim 9, wherein the program instructions are further configured to cause the at least one programmable processor to filter unknown bias and random noise using a band pass filter, wherein the band pass filter is configured to allow only frequencies above a frequency of the unknown bias, and below a frequency of the random noise.

17. A code minus carrier multipath observation and satellite exclusion apparatus comprising:
   a GNSS antenna coupled to a GNSS receiver, the antenna and receiver configured to receive a satellite carrier signal;
   a code-carrier difference generation unit coupled to the GNSS antenna and GNSS receiver, the code-carrier difference generation unit configured to generate a code-carrier difference for each of a plurality of satellite vehicle and signal frequency combinations, wherein the code-carrier difference is based on a code range and a carrier range; and
   a multipath detection unit coupled to the code-carrier difference generation unit, the multipath detection unit configured to filter the respective code-carrier difference to filter out an unknown bias and random noise; wherein the multipath detection unit is further configured to determine whether multipath is present for each of the plurality of satellite vehicle and signal frequency combinations based on the respective filtered code-carrier difference.

18. The apparatus of claim 17 further comprising a position solution calculator unit coupled to the multipath detection unit, the position solution calculator unit configured to calculate a position solution based on trust placed in respective measurements from each of the plurality of satellite vehicle and signal frequency combinations, the trust based on whether multipath is present for the respective satellite vehicle and signal frequency combination.

19. The apparatus of claim 18, wherein the position solution calculator unit is configured to exclude respective measurements from the position solution calculation if multipath is detected for the respective satellite vehicle and signal frequency combination.

20. The apparatus of claim 18, wherein the position solution calculator unit is configured to calculate a weighted least squares solution based on respective weighted measurements, wherein measurements from each of the plurality of satellite vehicle and frequency combinations are weighted based on a respective code-carrier difference for the respective satellite vehicle and frequency combination.

* * * * *